Dec. 22, 1970     B. WEICHBRODT ET AL     3,548,648

SONIC WORN CUTTING TOOL DETECTOR

Filed April 15, 1968     2 Sheets-Sheet 1

Inventors:
Bjorn Weichbrodt,
Stephen E. Grabkowski,
by Donald R. Campbell
Their Attorney.

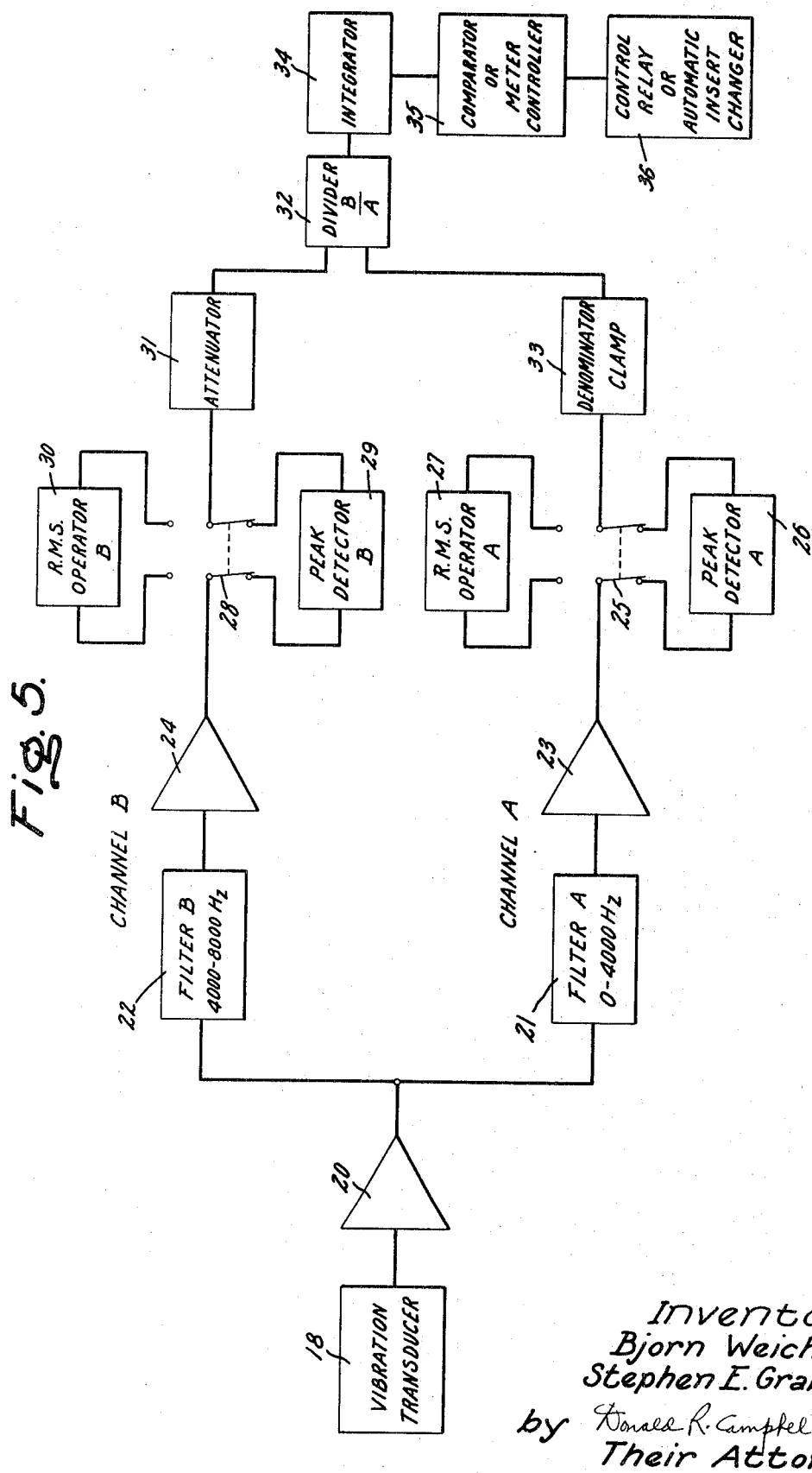

United States Patent Office 3,548,648
Patented Dec. 22, 1970

3,548,648
SONIC WORN CUTTING TOOL DETECTOR
Bjorn Weichbrodt and Stephen E. Grabkowski, Schenectady, N.Y., assignors to General Electric Company, a corporation of New York
Filed Apr. 15, 1968, Ser. No. 721,427
Int. Cl. G01n 19/02, 29/00
U.S. Cl. 73—104                                8 Claims

ABSTRACT OF THE DISCLOSURE

Vibrations generated by a worn cutting tool contain high frequency tonal energy not generated by a good cutting insert. The vibrations are sensed by a vibration transducer during the machining operation and separated by filters into two frequency ranges. When the ratio of the energy in the high frequency range exceeds that in the low frequency range by a predetermined amount, obtained by dividing the peak or RMS values of the respective signal components, an output indication is derived. The output can actuate an automatic cutting insert change.

SONIC WORN CUTTING TOOL DETECTION

This invention relates to a method and apparatus for the automatic detection of cutting tool wear during machining operations, and more particularly to the detection of worn cutting tools by sonic techniques so that the cutting tool can be manually or automatically replaced when a predetermined level of cutting edges wear has been reached.

In performing machining operations on a workpiece in a machine tool such as a lathe, milling machine, or planer, the rate of wear of the cutting tool edge depends largely upon the workpiece material and machining parameters such as feed, speed, and depth of cut. Thus the rate of wear can vary within wide limits. It is generally considered to be economical in production machining to operate the machine tool to achieve high metal removal rates, which means that the cutting tool wears out rapidly. The reason for this is that time and the machine are expensive, whereas the cutting tool insert is relatively low priced.

However, as the tool wear rate increases it becomes increasingly important to know exactly when to replace the worn cutting tool. If the cutting edge is replaced too soon the operation is not economical, and if it is replaced too late and the workpiece is machined with an excessively worn cutting edge, this may result in incorrect dimensions and degrade the surface finish. Therefore it is usually considered necessary to manually watch the cutting edge condition, even during an otherwise completely automatic machining operation, and manually replace the cutting insert when necessary. It is also possible to use an automatic insert changer, which can be set to replace each insert after a certain cutting time. However, all cutting tools do not fail after the same time interval, but over a range of time, and consequently the insert changer must be set to make the change at a short time interval to reduce the risk of running inserts which have failed. Most inserts will then be replaced before it is actually necessary, and optimum economy is not achieved.

Accordingly, an object of the invention is to provide a new and improved method and apparatus for automatically detecting the amount of wear of a cutting tool during a machining operation by utilizing the vibration pattern generated by the cutting action.

Another object of the invention is to provide a new and improved method and apparatus for detecting a worn cutting tool by continuously deriving indications of the amount of wear during a machining operation and producing an output indication when a predetermined wear level is reached at which it is desired to change the cutting tool insert.

Yet another object is the provision of a sonic worn tool detector of the foregoing type which is additionally compatible with an automatic insert changer, to implement a completely automatic tool replacement system.

A still further object is to provide for the detection of cutting tool wear using vibrational information generated by the cutting tool, wherein the vibrational information is processed by a ratio method so that the same tool wear detector apparatus can be used under a variety of machining conditions.

In accordance with the invention, the worn cutting tool detector comprises a vibration transducer mounted on the tool holder assembly of the machine tool for continuously sensing the sonic vibrations generated by the cutting action during the machining operation. A worn cutting tool produces high frequency tonal vibration energy not generated by a good cutting tool. Means are provided for separating from the total vibration energy and for detecting within a selected range of frequencies this high frequency tonal vibration energy due to wear. This is accomplished preferably by separating the tonal vibration energy by a filter technique into a high frequency component and a low frequency component and thereafter deriving the ratio of the two components. An output indication is produced by suitable means when the ratio, due to the increase of high frequency tonal vibration energy, exceeds a predetermined level indicative of a preselected amount of cutting tool wear. A method for automatic worn cutting tool detection involves the steps for processing the electrical signals derived at the output of the vibration transducer to produce the desired output indication.

The foregoing and other objects, features, and advantages of the invention will be apparent from the following more particular description of a preferred embodiment of the invention, as illustrated in the accompanying drawings wherein:

FIG. 5 is a block diagram of a ratio system for processing the vibrational information sensed by the vibration transducer to provide an output when the amount of cutting tool wear exceeds a predetermined level.

Figure 1:
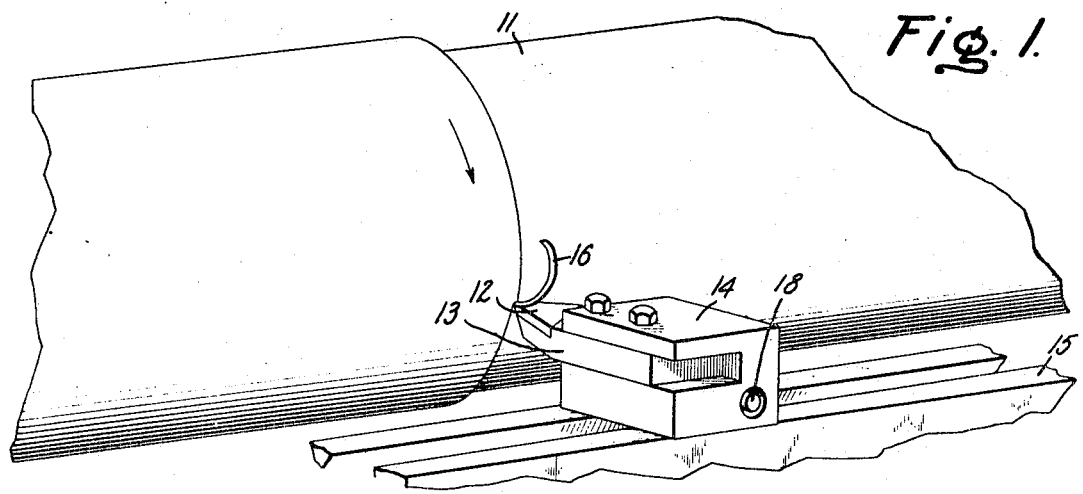
FIG. 1 is a perspective view of a rotating workpiece being machined by a cutting tool insert mounted on a tool holder assembly forming a portion of a machine tool not here shown.

In FIG. 1 is shown a portion of a metallic workpiece 11 rotating in the direction indicated by the arrow and being machined by the cutting edge of a cutting tool insert 12. Although the invention is here illustrated by way of example in connection with a lathe for turning round stock to a desired dimension, it is appreciated that it is applicable as well to other machine tools such as milling machines, planers, etc. The replaceable cutting tool insert 12 is secured to the front end of a tool holder 13 which in turn is clamped to a tool holder post 14, these three parts constituting a cutting insert and tool holder assembly. This assembly is attached to a pair of parallel guideways 15 in such manner that the cutting insert 12 is retractable to and from the workpiece 11 to adjust the depth of cut and to bring the cutting tool into engagement with the workpiece and out of engagement with it. The cutting tool insert 12 is also movable along the axis of the workpiece in the feed direction as the machining operation proceeds.

The cutting action causes vibrations to be generated at the cutting edge of the cutting tool insert 12, and these vibrations propagate through the cutting insert and tool holder assembly and adjacent portions of the parallel guideways 15 much in the same manner as sound waves in a room. The vibrational sonic waves produced at the cutting edge as a source of sound propagate through the cutting insert 12, the tool holder 13, and the tool holder post 14, being additionally reflected at the boundaries and interfaces of these parts. The worn cutting tool detection method and apparatus herein disclosed utilizes the fact that the vibrations generated at the interface of a sharp cutting edge and the workpiece are different from the vibrations generated at the interface of a worn cutting edge and a workpiece.

Figure 2:
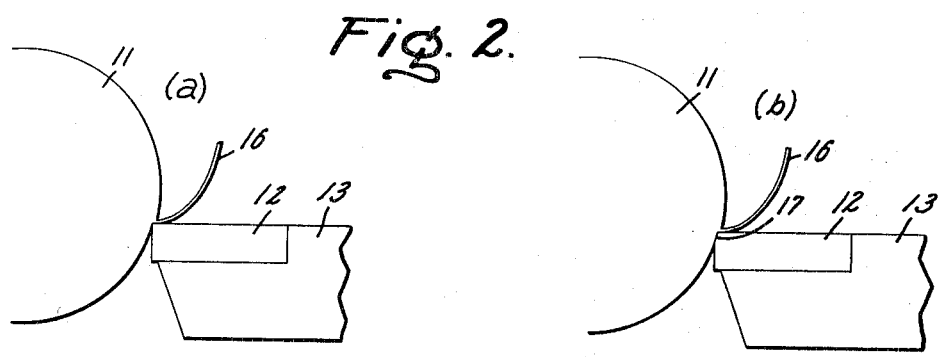
FIGS. 2a and 2b are enlarged fragmentary views through the workpiece including a side view of the cutting tool insert and holder to illustrate respectively the condition of the cutting tool with a sharp edge and worn edge.

Referring to FIG. 2a, a sharp cutting edge at the forward end of the cutting insert 12 generates vibrations caused by the formation and fracture of chips 16 during the machining operation as metal is removed from the surface of the workpiece 11 by the cutting tool. As the cutting edge wears, a flattened wear land 17 is produced at the cutting edge, see FIG. 2b, and the greater contact area of the worn cutting edge generates additional vibrations caused by sliding contact with the workpiece. This is the familiar squeal or screech produced by a worn cutting tool.

Figure 3:
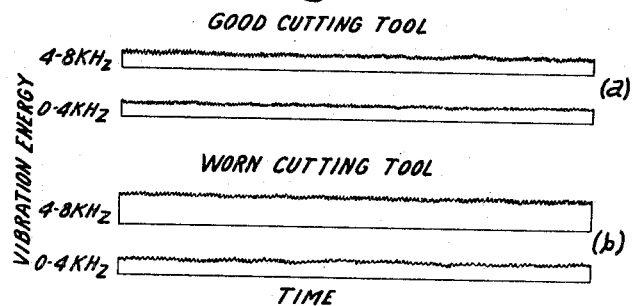
FIGS. 3a and 3b are plots of vibration energy vs. time for two frequency ranges respectively for a good cutting tool and a worn cutting tool.

The vibrations generated in the cutting insert and tool holder assembly by the cutting action contain considerably more high frequency energy when the cutting edge is worn than when the edge is sharp. To sense the sonic vibrations, a suitable vibration transducer 18 (FIG. 1) such as a piezoelectric accelerometer is mounted on the tool holder assembly, i.e., on the tool holder 13 or more conveniently on the tool holder post 14. In FIG. 3 the total vibrational energy content, as sensed by the transducer 18, is plotted against time for two cutting edge conditions. The vibration energy is divided into two frequency components, one in a high frequency range and the other in a low frequency range. The low frequency component is typically 0–4000 Hz., while the high frequency component is typically 4000–8000 Hz. As is readily seen by comparing FIGS. 3a and 3b, the low frequency band energy for a good cutting tool and worn cutting tool is about the same, but the high frequency band energy for a worn cutting tool is considerably higher than for a good cutting tool. The vibratory signals generated by the vibration transducer when a good cutting tool is used in general contain noise, or a random sound composed of many different frequencies not harmonically related, that is proportional to such factors as the speed of rotation of the workpiece 11, and the cutting depth and rate of feed of the cutting insert 12. This noise appears in many frequencies in the sonic range up to about 20 kHz., and is also present in a worn cutting tool. But the worn cutting tool also produces high frequency vibration energy which is indicative of the wear of the tool.

It has been found that the total amount of high frequency vibration energy increases as the length of the cutting edge wear land increases, and this phenomenon can be observed consistently even if the cutting parameters such as feed, speed, and depth of cut are varied within wide ranges. Further analysis of the vibration signals obtained from the vibration transducer shows that the additional high frequency vibration energy generated by a worn cutting edge is concentrated to a few narrow frequency bands, and consist mainly of sinusoidal vibrations or tones. These tones comprise a fundamental frequency and several overtones including at least the first and second harmonic, and the fundamental frequency is at the resonant frequency of the cutter insert and tool holder assembly excited by the friction of the cutting edge rubbing on the workpiece. Through calculations it has been determined that the observed tones are vibrations of the cutter insert and tool holder assembly, and not by the workpiece itself or other parts of the machine tool.

Figure 4:
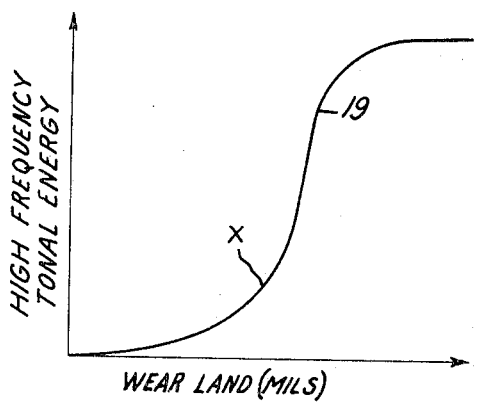
FIG. 4 is a characteristic curve of high frequency tonal energy vs. wear land illustrating the rapid increase in high frequency tonal energy when tool wear reaches a certain point.

The characteristic curve illustrating the manner in which the high frequency tonal energy due to wear increases with the length of the wear land is illustrated in FIG. 4. This is seen to be an approximately S-shaped function in which there is a rapid change of slope in the vicinity of about 10–20 mils of land wear before rounding out to a substantially horizontal tonal energy level. The "step" in the characteristic curve 19 is advantageously located, since 20 mils is approximately the wear land at which it usually is economical to replace the cutting insert. It is more desirable, actually, to detect the worn cutting tool at the point X on the curve shrown in FIG. 4, to avoid any possibility of damage to the workpiece 11 when the wear land becomes larger than it is at the point X.

In practice it is difficult to detect only, or by itself, the high frequency tonal energy due to wear, since the fundamental frequency so produced and therefore the overtones is dependent on a number of factors including the size of the cutting insert, tool holder, and tool holder post, and the size and material of the workpiece, etc. In devising an automatic worn cutting tool detection method and a suitable worn cutting tool detector that is suitable for a variety of machine tools and workpieces, it is better to determine the ratio of the total amount of high frequency vibration energy to the total amount of low frequency vibration energy much in the same manner as was done in FIG. 3, and produce an output indication when the ratio between the two energy levels exceeds a predetermined value indicative of a worn cutting tool. At this predetermined value, the high frequency tonal energy due to wear dominates the total vibration energy to a certain degree, and is an indication of sufficient cutting edge wear that the cutting tool should be replaced. By the use of a ratio detection method, the gain range requirements for a suitable worn cutting tool detection apparatus for practicing the method are considerably smaller than if the total amount of high frequency vibration energy or the high frequency tonal energy due to wear were detected in absolute terms without regard to a particular reference.

The preferred method for automatic worn cutting tool detection, then, comprises the following general steps. During the machining operation, the vibrations of the tool assembly or any other parts structurally close to the cutting edge are sensed by a vibration transducer to produce output signals representative of the vibratory pattern generated due to the cutting action. By the use of a frequency filter technique, the sensed vibration signals are divided into two frequency component ranges. The higher frequency range contains at least the fundamental frequency and first and second harmonics of the high frequency tonal energy due to wear. The level of the separated high frequency signal component is compared with the level of the remaining low frequency signal component, and an output indication is produced when the ratio between the two levels exceeds a predetermined value indicative of a preselected amount of cutting tool insert wear.

The vibration transducer 18 shown in FIG. 1 is preferably located on and recessed into the tool holder post 14. The tool holder 13 may be changed from one job to the next, and the cutting insert 12 is of course replaceable, so these do not make desirable locations for mounting the vibration transducer. Likewise, the vibration transducer 18 could be mounted on a portion of the parallel guideways 15 adjacent to the tool holder post 14, however in this location the vibration signals will have a smaller amplitude. The vibration transducer 18 can be an accelerometer, a velocity meter, or a displacement meter, or any other suitable transducer which senses the vibrations of the cutting tool insert and produces electrical signals representative of these vibrations.

The preferred form of an automatic worn cutting tool detector operating in accordance with the ratio method of detection is shown in FIG. 5. The output of the vibration transducer 18, which senses the different sonic frequencies making up the vibratory pattern caused by the cutting action, is first fed to a signal preamplifier 20. The input signal is next fed in parallel to two band-pass filters 21 and 22 where it is separated into two frequency range signal components. The electrical filter 21 located in Channel A is identified as filter A and passes only the low frequency signal components of the input signal, typically 0–4,000 Hz. The electrical filter 22 in Channel B is identified as filter B and passes only the selected high frequency signal components, typically 4,000–8,000 Hz. The separated low frequency signal components in Channel A are amplified by an amplifier 23, while the separated high frequency signal components in Channel B are amplified by amplifier 24. The amplification is used to increase the level of the signal components for detection in the RMS or the peak detect modes. If the signal level from the preamplifier is sufficiently high, which may be the case in some applications, amplifiers 23 and 24 may be excluded.

In Channel A double-throw switch 25 is used to select the detection mode and direct the output of the amplifier 23 to a peak detector 26 or to an RMS operator 27. As is well known, the peak detector circuit 26 produces an output dependent on the peak values of the low frequency signal components, whereas the RMS operator circuit 27 produces an output which is dependent on the RMS value of the low frequency signal components. At the same time the high frequency signal components in Channel B are being processed in the same manner by means of a double-throw switch 28 which supplies these signal components to a peak detector 29 or an RMS operator 30. The selected output of the stage is fed to an attenuator 31 to reduce the voltage level, if necessary, to an appropriate level to serve as one input to a divider circuit 32. The other input to the divider 32 is obtained from Channel A and this channel contains a denominator clamp 33 to prevent the denominator from going to zero. The divider 32 continuously calculates or determines the ratio of the two signals $B/A$ and produces a voltage output representative of the calculated ratio. The division can be performed, for instance, in a Philbrick Researches multiplier-divider, Model Q3–MIP. In the division mode the output of this multiplier-divider equipment is a D-C voltage proportional to the ratio of the signal content of each frequency band as selected by the filters 21 and 22.

The output of the divider 32 is preferably fed to an integrator circuit 34 to prevent short transients from producing a false output indication that a worn tool exists. The integrated signal representative of the calculated ratio is next fed to a comparator circuit 35 or can be supplied to a meter controller for producing a visual output of the extent of tool wear. When the extent of tool wear exceeds a predetermined level, an output indication is produced.

As shown by the box 36, the output indication can actuate a control relay for an automatic insert changer mechanism. The control relay is connected to automatically interrupt the machining cycle by causing the horizontal feed of the cutter to stop and withdraw from the workpiece. It can also actuate a trip switch in an automatic insert changing mechanism of the type disclosed for example in the copending patent application of Floyd L. Kirkham, Ser. No. 520,233, now Pat. No. 3,368,265, filed Jan. 12, 1966, and assigned to the same assignee as the present invention. Briefly, closing of the trip switch stops radial withdrawal feed and then allows the automatic insert changer to replace the worn cutting tool insert 12. When the worn tool detector is combined with an automatic insert changer, the worn cutting insert is detected and changed completely automatically with the exception of returning the cutter to its original machining position.

In summary, the automatic detection of worn cutting tools having a predetermined amount of wear is accomplished as the machining proceeds by analyzing the sonic vibration signals generated by the cutting action. The technique employed is known generally as mechanical signature analysis, and relies on the fact that worn cutting tool inserts produce high frequency vibration energy not generated by good cutting inserts. By obtaining the ratio of high frequency vibration energy to low frequency vibration energy, the specific filter settings and detection modes (RMS versus peak) being adjustable, and deriving an output indication when and adjustable preset level of wear has been reached, the worn tool detector becomes a general purpose rather than a tailor-made instrument. An outstanding advantage of the invention is that it eliminates the need for close manual supervision during the machining operation, and it can be coupled to an automatic insert changer to implement a completely automatic tool replacement system. Moreover, the vibration sensor used to pick up vibration signals need not be located on the cutting tool insert or tool holder, and both of these can be replaced without relocating the sensor.

While the invention has been particularly shown and described with reference to a preferred embodiment thereof, it will be understood by those skilled in the art that various changes in form and details may be made therein without departing from the spirit and scope of the invention.

What we claim as new and desire to secure by Letters Patent of the United States is:

1. A system for detecting wear of a cutting tool attached to a tool holder for machining a workpiece, the cutting action of said cutting tool producing a low frequency component of vibration and a high frequency component of vibration, the amplitude of said high frequency component of vibration increasing with wear of said cutting tool due to the cutting action thereof comprising a vibration transducer means coupled to said tool holder for sensing vibrations therein generated during a machining operation and for converting said vibrations into electrical signals, band pass filter means for separating said electrical signals into a high frequency component signal and a low frequency component signal, each having a respective preselected frequency range, means for comparing the amplitudes of said high frequency component signal and said low frequency component signal, and means for producing an output indication indicative of a predetermined degree of cutting tool wear when the amplitude of said high frequency component signal has a predetermined relationship to the amplitude of said low frequency component signal.

2. The combination of claim 1 in which said comparing means and said means for producing an output include a divider means for determining the ratio of high frequency component signal to the low frequency component signal and means for producing an output indication when the ratio exceeds a predetermined level indicative of a preselected amount of cutting tool wear.

3. The combination of claim 2 in which a peak detector means is connected between said filter means and said divider means for deriving voltage signals representative of the respective levels of the high frequency and low frequency component signals and integrator means connected to the output of the divider means to prevent the production of a false output indication in response to transient vibrations.

4. The combination of claim 2 in which an RMS operator means is connected between said filter means and said divider means for deriving voltage signals representative of the respective levels of the high frequency and low frequency component signals and integrator means connected to the output of said divider means to prevent the production of a false output indication in response to transient vibrations.

5. The combination of claim 1 in which said band pass filter means has a preselected low frequency range of 0 to 4000 Hz. and a preselected high frequency range of 4000 to 8000 Hz.

6. A method for automatically detecting worn cutting tools used to machine workpieces in a machine tool comprising the steps of continuously producing in a vibration transducer electrical signals representative of the sonic vibrations of the cutting tool edge generated by the cutting action during machining operation, separating the vibration signals into at least two frequency component signals wherein one component has a selected high frequency range and the other component has a selected low frequency range, dividing the high frequency component signal by the low frequency component signal to obtain another signal representative of the ratio of the levels of the two frequency component signals, and producing an output indication when the signal representative of the ratio exceeds a predetermined level indicative of a preselected amount of cutting tool wear.

7. A method as defined in claim 6 including the additional step of processing each of the separated frequency component signals to derive voltage levels proportional to the values of the respective component signals, the high frequency component voltage level being divided by the low frequency component voltage level to obtain the signal representative of the ratio of the levels of the two frequency components.

8. A method as defined in claim 7 wherein the high frequency component signal has a frequency range of 0–4,000 Hz. and the low frequency component signal has a frequency range of 4,000–8,000 Hz., and further including the step of integrating the signal representative of the ratio of the levels of the two frequency component signals to prevent the production of a false output indication due to transients.

References Cited
UNITED STATES PATENTS

| | | | |
|---|---|---|---|
| 2,730,896 | 1/1956 | Boisblanc | 73—69X |
| 3,095,532 | 1/1963 | Floyd | 73—67X |
| 3,393,557 | 7/1968 | Brown et al. | 73—67.2 |

RICHARD C. QUEISSER, Primary Examiner

E. J. KOCH, Assistant Examiner

U.S. Cl. X.R.

73—67